US012650880B2

(12) United States Patent
Stanway et al.

(10) Patent No.: US 12,650,880 B2
(45) Date of Patent: Jun. 9, 2026

(54) HEAT ENERGY CAPTURE AND STORAGE SYSTEMS

(71) Applicant: THERMO SOLUTIONS LTD., Richmond (CA)

(72) Inventors: Gregory Stanway, Richmond (CA); Taylor Dean, Richmond (CA); Matthew Rektor, Richmond (CA)

(73) Assignee: THERMO SOLUTIONS LTD., Richmond (CA)

( * ) Notice: Subject to any disclaimer, the term of this patent is extended or adjusted under 35 U.S.C. 154(b) by 0 days.

(21) Appl. No.: 19/398,899

(22) Filed: Nov. 24, 2025

(65) Prior Publication Data

US 2026/0147615 A1      May 28, 2026

Related U.S. Application Data

(60) Provisional application No. 63/723,689, filed on Nov. 22, 2024.

(51) Int. Cl.
*G06F 9/48* (2006.01)
*G05B 15/02* (2006.01)

(52) U.S. Cl.
CPC ........... *G06F 9/4893* (2013.01); *G05B 15/02* (2013.01)

(58) Field of Classification Search
CPC .............................. G06F 9/4893; G05B 15/02
See application file for complete search history.

(56) References Cited

U.S. PATENT DOCUMENTS

| | | | |
|---|---|---|---|
| 8,788,101 | B2 | 7/2014 | Pulley |
| 9,958,882 | B2 | 5/2018 | Struckmeier et al. |
| 9,967,334 | B2 | 5/2018 | Ford |
| 10,036,272 | B2 | 7/2018 | Somani et al. |
| 10,395,256 | B2 | 8/2019 | Harris et al. |
| 10,778,773 | B2 | 9/2020 | Wheeler |
| 10,965,136 | B2 | 3/2021 | Wheeler |
| 11,862,971 | B2 | 1/2024 | Orsini |
| 11,974,412 | B2 | 4/2024 | Benson et al. |
| 12,050,446 | B2 | 7/2024 | Orsini |
| 12,118,628 | B2 | 10/2024 | Orsini |
| 12,216,626 | B2 | 2/2025 | Orsini |

(Continued)

FOREIGN PATENT DOCUMENTS

| | | | |
|---|---|---|---|
| DE | 102013100056 | B3 | 10/2013 |
| DE | 102017121365 | A1 | 3/2019 |

(Continued)

*Primary Examiner* — Kenneth Tang
(74) *Attorney, Agent, or Firm* — Oyen Wiggs Green & Mutala LLP

(57) ABSTRACT

A system and method for capturing heat energy are disclosed. The system comprises a central processing platform, at least one heating system comprising at least one computing unit, one or more Application Programming Interfaces (API) components on the central processing platform, and a job queue. The at least one computing unit has one or more computing nodes communicatively connected over a wired and/or wireless network and to the central processing platform. The at least one heating system is installed at a premise. The at least one heating system is configured to output heat generated from the respective at least one computing unit by the one or more computing nodes executing a processing job.

13 Claims, 3 Drawing Sheets

(56)                    References Cited

U.S. PATENT DOCUMENTS

| | | | |
|---|---|---|---|
| 12,232,295 B2 | 2/2025 | Weisemann et al. | |
| 12,309,980 B2 | 5/2025 | Orsini et al. | |
| 2012/0158190 A1* | 6/2012 | Belady | G05B 15/02 |
| | | | 700/282 |
| 2014/0075222 A1* | 3/2014 | Jackson | G06F 1/329 |
| | | | 713/320 |
| 2016/0092988 A1 | 3/2016 | Letourneau | |
| 2017/0264493 A1* | 9/2017 | Cencini | H04L 41/044 |
| 2019/0164236 A1 | 5/2019 | Mayne et al. | |
| 2020/0042608 A1 | 2/2020 | Gahlot et al. | |
| 2022/0214727 A1 | 7/2022 | Duchesne et al. | |
| 2022/0217861 A1 | 7/2022 | Strech | |
| 2023/0061162 A1* | 3/2023 | Goska | G05B 13/027 |
| 2023/0209772 A1* | 6/2023 | Guim Bernat | G06F 1/206 |
| | | | 361/679.53 |
| 2023/0213287 A1 | 7/2023 | Struckmeier et al. | |
| 2024/0078617 A1 | 3/2024 | Winand et al. | |
| 2024/0378088 A1 | 11/2024 | Govindan et al. | |

FOREIGN PATENT DOCUMENTS

| | | | |
|---|---|---|---|
| DE | 102011122971 B3 | 11/2020 | |
| DE | 102019126970 A1 | 4/2021 | |
| GB | 2596245 B | 5/2023 | |
| WO | 2006119729 A2 | 11/2006 | |
| WO | 2020223808 A1 | 11/2020 | |
| WO | 2024105135 A1 | 5/2024 | |
| WO | 2024174041 A1 | 8/2024 | |

* cited by examiner

HEAT ENERGY CAPTURE AND STORAGE SYSTEMS

CROSS-REFERENCE TO RELATED APPLICATIONS

This application claims priority from U.S. application No. 63/723,689 filed 22 Nov. 2024 and entitled HEAT ENERGY CAPTURE AND STORAGE SYSTEMS which is hereby incorporated herein by reference for all purposes. This application claims the benefit under 35 U.S.C. § 119 of U.S. application No. 63/723,689 filed 22 Nov. 2024 and entitled HEAT ENERGY CAPTURE AND STORAGE SYSTEMS which is hereby incorporated herein by reference for all purposes.

FIELD

This invention pertains to systems and methods for capturing heat energy, in particular, heat energy that is in the form of computationally generated thermal energy.

BACKGROUND

A significant amount of energy consumption is dedicated to heating, particularly in locations which experiences cold winters. For example, approximately 40% of Canada's energy consumption is dedicated to heating. Traditional heating systems and methods are inefficient. The heat that traditional heating systems generate results from undesirably converting electrical energy into heat waste. Such heat waste presents a threat to environmental and human health by enhancing rising temperatures and heat. Such heating processes are also financially wasteful.

Commercial buildings are primarily heated by a diesel and gas-powered district energy system. Such heating process undesirably contributes to pollution, GHG (greenhouse gas) production and waste.

There is a need for an improved heat energy capture system which is operable to produce electric, clean heat energy at zero or minimal cost.

SUMMARY

The invention pertains to systems and methods for capturing heat energy. In some aspects of the invention, a system for capturing heat energy is provided. The system comprises a central processing platform, at least one heating system comprising at least one computing unit, one or more Application Programming Interfaces (API) components on the central processing platform, and a job queue. The at least one computing unit has one or more computing nodes communicatively connected over a wired and/or wireless network and to the central processing platform. The at least one heating system is installed at a premise. The at least one heating system is configured to output heat generated from the respective at least one computing unit by the one or more computing nodes executing a processing job.

In some embodiments, the one or more API components comprise a Compute Management Service programmed and configured to receive a request for a processing job, and in response, create a cluster comprising the one or more computing nodes that have indicated as having an available status. The available status of the one or more computing nodes correlates with a demand for heat at the respective at least one heating system. The one or more computing nodes in the created cluster is programmed and configured to execute the processing job assigned by the Compute Management Service.

In some embodiments, the one or more API components additionally comprise a Distributed Training Service communicatively connected to the one or more computing nodes. The Distributed Training Service is programmed and configured to orchestrate the incoming processing jobs between the assigned one or more computing nodes.

In some embodiments, the one or more API components additionally comprise an Adaptive Cluster Configuration Service communicatively connected to the Compute Management Service. The Adaptive Cluster Configuration Service is programmed and configured to transmit to the Compute Management Service clustering options for creating the cluster.

The job queue is communicatively connected to the Compute Management Service and the Distributed Training Service. The job queue is configured to receive from the Compute Management Service information about the processing job and to transmit to the Distributed Training Service said information about the processing job.

In some aspects of the invention, a method for capturing heat energy is provided. The method comprising the steps of: receiving, at a central processing platform, a processing job request; monitoring, at the central processing platform, a status of one or more computing nodes connected to the platform; and in response to the status of the one or more computing nodes connected to the platform and the processing job request, creating a cluster comprising one or more of the computing modes that have indicated an available status; transmitting from the central processing platform to a job queue, information about the processing job and information about the created cluster; transmitting the information about the processing job and the information about the created cluster, from the job queue to a third Application Programming Interface (API) component; distributing from the third API component to the one or more computing nodes in the created cluster the information about the processing job and the information about the created cluster; executing, at the one or more computing nodes in the created cluster, the processing job, and outputting heat at the one or more computing nodes. In some embodiments, each of the computing nodes are connected to a heating system. The heating system is installed at a respective premise. The available status at the one or more computing nodes is an indication of a demand for heat at the respective heating system.

In some embodiments, the method further comprising transmitting, from the one or more computing nodes of the created cluster to a model storage component, an intermediate model produced from the executing of the processing job at the end of each training epoch.

In some embodiments, the method further comprising transmitting, from the one or more computing nodes to the central processing platform, in the middle of the executing of the processing job, an indication of an unavailable status in response to a signal at the respective heating system that heat is not desired at the respective premise. The third API component may then transmit to the one or more computing nodes of the created cluster a signal to halt the executing of the processing job, resulting with an unfinished processing job. The central processing platform may recreate a new cluster comprising one or more computing nodes that have indicated an available status. The model storage component may transmit to the central processing the intermediate model associated with the unfinished processing job. The central processing platform may transmit to the job queue, information about the unfinished processing job, information about the new cluster, and the intermediate model. The job queue may transmit to the third API component the information about the unfinished processing job, the information about the new cluster, and the intermediate model. The third API component may distribute to the one or more computing nodes in the new cluster, the information about the unfinished processing job, the information about the new cluster, and the intermediate model. In response, the one or more computing nodes in the new cluster execute the unfinished processing job, thereby outputting heat at the one or more computing nodes in the new cluster.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

This invention pertains to a heat energy capture system and methods of capturing heat energy. The heat energy capture system is designed to generate thermal energy by a decentralized computing network. The computing network comprises a central processing platform. The central processing platform is programmed and configured to distribute processing jobs (e.g., an AI model training job or AI inference job, etc.) requested by one or more client to a distributed computing network comprising a plurality of computing units each comprising one or more nodes. The computing units are configured to output waste heat generated from computation processing to a respective heating system to provide heat to a respective premise within which the heating system is installed. The central processing platform is programmed and configured to create a cluster comprising one or more available computing nodes to execute an incoming processing job. The availability of computing nodes in the cluster may dynamically change during a processing job. The central processing platform is programmed and configured to reconfigure the initially created cluster and/or create a new cluster and/or redistribute computing nodes in the initially created cluster in response to the dynamically changing node availability. The number of computing nodes in a cluster is not fixed. The reconfiguration and/or creation and/or redistribution of clusters and/or computing nodes may result in a different number of nodes or a different set of nodes being assigned to a processing job in the middle of a processing job. The processing job may thus be interrupted in the middle of the job. One application of the described heat energy capture system is in the field of AI model training. The described heat energy capture system advantageously solves known technical challenges associated with redistribution of computation loads to AI model training tasks, for example, the need for constant GPU count to perform batching calculations, complications associated with heterogeneous computer hardware types, firewall/network configurations, etc.

Figure 1:
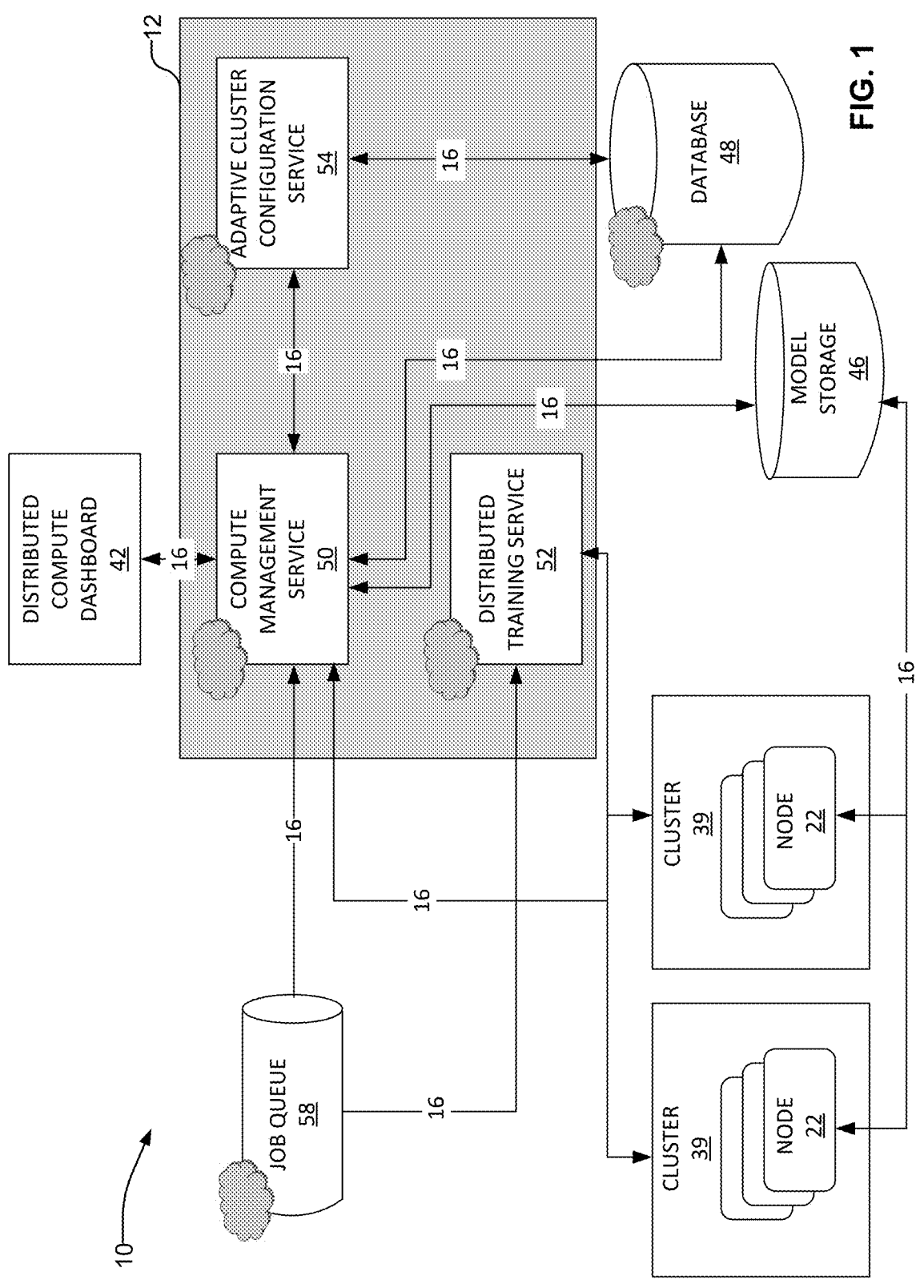
FIG. 1 is a schematic diagram illustrating a system for capturing heat energy according to an example embodiment of the invention.
Figure 2:
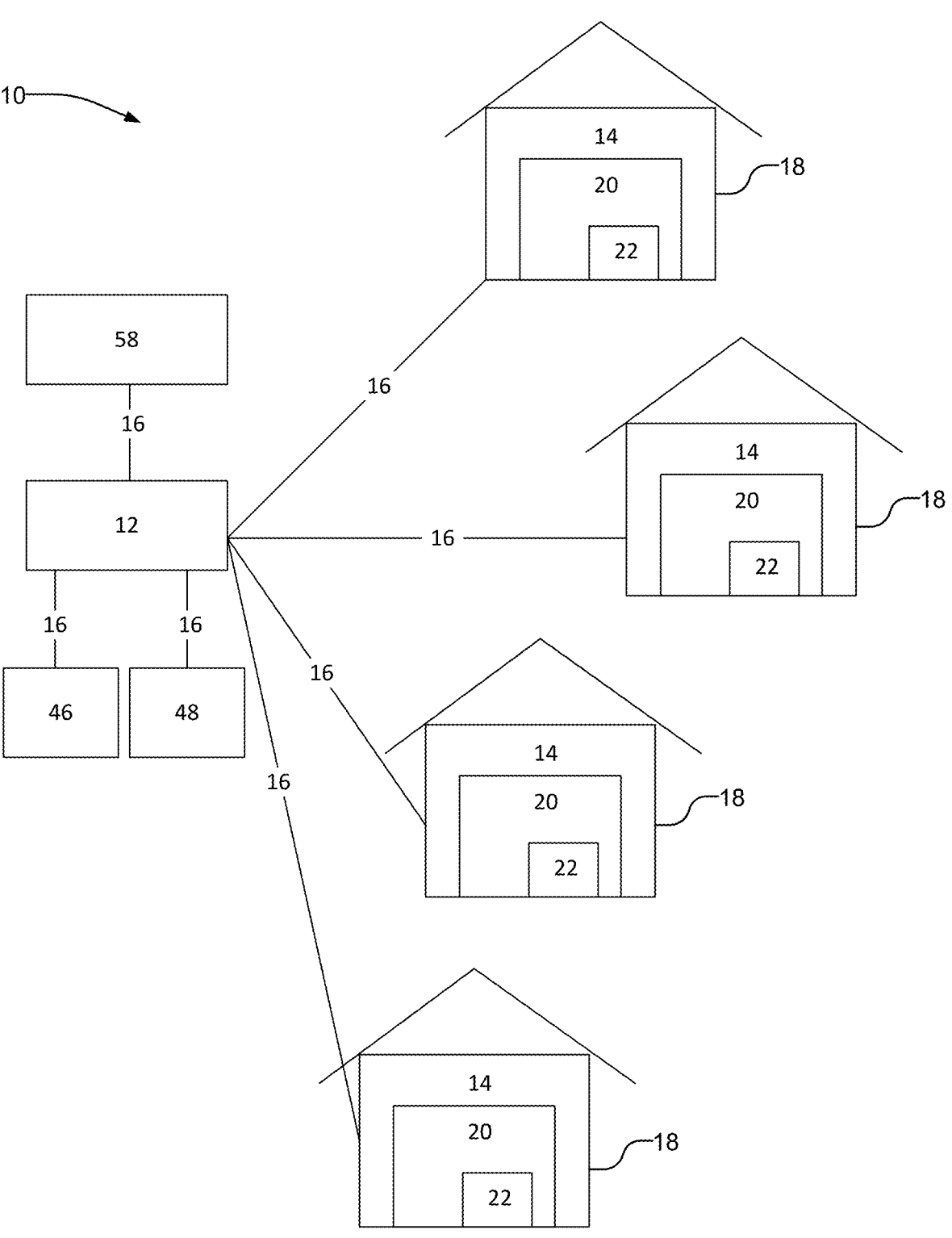
FIG. 2 is a schematic diagram illustrating a system for capturing heat energy, showing the decentralized computing units associated with one or more heating systems which are distributed across geographical locations, according to an example embodiment of the invention.

One aspect of the invention relates to a heat energy capture system 10. Referring to FIGS. 1 and 2, the heat energy capture system 10 has a central processing platform 12. The central processing platform 12 is connected to a plurality of heating systems 14. The heating systems 14 may be integrated in one or more premises 18 (e.g., households or industrial buildings). The plurality of heating systems 14 may be integrated in different premises at different geographical locations. The heating systems 14 are connected to a network 16. The network 16 may be a closed network (e.g., intranet) or a public network (e.g., internet). As used herein, "connection" means connections that can be configured as wire-bound and/or wireless connections. Wire-bound connections may for example be conventional telephone lines which are capable of making available an Internet connection via Modem, ISDN (Integrated Services Digital Network) and/or DSL (Digital Subscriber Line) and/or glass fiber cables and/or television cables. Wireless connections may for example be by means of a WLAN Network (Wireless Local Area Network) and/or by means of a mobile radio network.

Each of the heating systems 14 comprise at least one computing unit 20. The computing unit 20 is configured to output its waste heat (e.g., excess heat that is generated as a byproduct of processing) to the respective heating system 14. Waste heat may be caused to be transmitted to a heat distributing device of a building heating system. For example, such heat distribution device may be a heat conduction system which comprises components such as lines, pipes, valves, flow regulators, and/or heat exchangers.

The plurality of computing units 20 and the central processing platform 12 may be communicatively connected to one another to form a computer cloud, such as via a peer-to-peer network for example by means for the Internet and/or a VPN network (Virtual Private Network). The heat energy capture system 10 comprises a group of computing units 20 which make available computing power and heating power. The central processing platform 12 may be configured and programmed to coordinate the distribution of incoming processing jobs to the computing units 20. The incoming processing jobs may be requested by a client. The central processing platform 12 thus acts as a controlling and supervision entity which controls the plurality of computing units 20 connected in a distributed computing network as a function of one or more parameters which may include computing requirements, heating demand, hardware types, firewall/network configurations, etc. The processing jobs may comprise tasks such as one or more of artificial intelligence (AI) training, AI inference, deep learning training, system development, data processing and rendering, etc.

Figure 3:
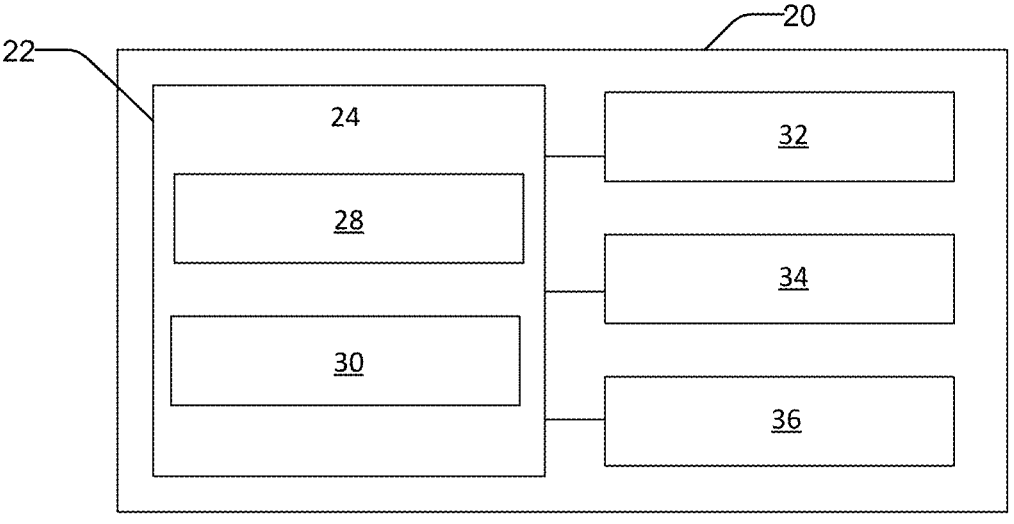
FIG. 3 is an example design of a computing unit which may be used in the system for capturing heat energy.

FIG. 3 illustrates an example design of a computing unit 20. The computing unit 20 has one or more computing nodes 22. The computing node 22 has a main board 24 with at least one graphics processing unit (GPU) 28 and a working memory 30. The main board 24 may be connected to a memory medium 32 (e.g., in the form of a hard disk, a solid state drive (SSD), or of a flash drive), a network adaptor 34, and a power supply 36. The power supply 36 may be configured to switch the computing node 22 on/off, for example in the event of a power failure. The computing nodes 22 may be distributed. The distributed nodes 22 may be connected to one another, and/or to the central processing platform 12 by a network adapter 38.

In some embodiments, the central processing platform 12 comprises one or more Application Programming Interfaces (API) components. The one or more API components may be programmed and configured to receive from a client 40 a request for a processing job (e.g., an AI model training job), for example through a dashboard interface 42. The one or more API components may be programmed and configured to manage processing job requests by creating one or more clusters 39 each containing one or more computing nodes 22. Each cluster 39 may contain any number of computing nodes 22. The size of the cluster 39 may be configurable based on the size and/or complexity of the incoming processing job. The one or more computing nodes 22 in a particular cluster 39 may comprise computing nodes 22 that have been indicated as being available for processing jobs. The availability of a computing node 22 for a particular processing job may be determined by factors such as: whether the computing node 22 is reserved for another processing job; and/or whether the computing node 22 is physically located in a premise that wants to execute the processing job to produce heat, etc.

The requested processing job(s) are distributed to the created one or more clusters 39 comprising one or more computing nodes 22. In some embodiments, the computing nodes 22 that are grouped into a cluster 39 has "node affinity" with one another. "Node affinity" means a property of a node 22. In some embodiments, affinity may be set during registration of a node 22, for example at the time at which the node 22 is included on the platform 14. Affinity of the node 22 may be specified by the node 22 itself. In some embodiments, nodes 22 which are selected to be in one cluster 39 are compatible with each other from a model training perspective. For example, the central processing platform 12 may ensure that all of the nodes in the cluster are compatible with one another in order to provide AI model training in parallel, such as by way of data parallelism and model parallelism. The nodes 22 that are selected to be in one cluster are sufficiently compatible to communicate with one another. Factors such as hardware compatibility, firewall/network configurations and/or geographical location may factor into a node's affinity. As one example, nodes which operate on AMD GPUs may not have the same affinity as nodes which operate on NVIDIA GPUs since their underlying libraries are different, and thus are generally not grouped in the same cluster. As another example, nodes which are in close proximity may have higher affinity than nodes which are located further away.

In some embodiments, the one or more API components are configured to orchestrate the processing jobs performed by the initial cluster comprising the assigned computing node(s) 22. The orchestration may involve receiving an incoming processing job assignment, and communicating the job assignment with the assigned computing node(s) 22 in the created cluster 39. The orchestration may involve transmitting information pertaining to the processing job to the assigned computing node(s) 22. In some embodiments in which the processing job comprises AI model training, such information may for example include access to the base model or intermediate model and/or any training data that are necessary for the assigned computing nodes 22 to start the processing job.

In some embodiments, the one or more API components are programmed and configured to monitor the statuses of the one or more computing nodes 22. The one or more API components may be programmed and configured to determine clustering options, based on the statuses of the one or more computing nodes 22. For example, an assigned computing node(s) 22 may need to shut down during a processing job for reasons such as power or network failure or external requirements (e.g., heat demands). Such a node 22 may be programmed and configured to transmit to the one or more API components its status change. Such status change may require reconfiguration of the initially created cluster 39, such as by redistributing the available one or more computing nodes 22 by adding and/or removing one or more nodes 22 in the initial cluster 39, and/or creating a new cluster 39 containing one or more of the available computing nodes 22, in order to complete the processing job.

The one or more API components may be connected to one another and/or one or more clients 40 and/or one or more computing nodes 22 and/or a front end dashboard 42 and other components of the platform 12 such as data stores to execute the requested processing job(s) by reconfiguring the initially created cluster or creating a new cluster in the middle of a processing job in the event that one or more of the API components determine that such reconfiguration or creation is necessary based on the dynamic availability of the nodes 22 on the platform 12.

In some example embodiments, the central processing platform 12 comprises a first API component that is programmed and configured to manage the processing jobs. The first API component may be referred to as a "Compute Management Service 50". The Compute Management Service 50 may be programmed and configured to receive processing job requests from a client 40, for example, via a dashboard interface, an example of which is referred to herein as the "Distributed Compute Dashboard 42". The Compute Management Service 50 may be programmed and configured to manage the processing job requests. The Compute Management Service 50 may be programmed and configured to create the one or more clusters of computing nodes 22 based on information pertaining to the incoming processing job requests (e.g., the number of requests or jobs requested, the nature of the job, etc.) and statuses and/or affinity of the computing nodes 22 (e.g., the number of nodes 22 that are available, the CPU/GPU capacity of the available nodes 22, the number of available nodes 22 that are compatible or have affinity with one another, etc.). In some embodiments, the Compute Management Service 50 is programmed and configured to send processing job(s) to a job queue 58. Along with the processing job(s), the Compute Management Service 50 may transmit to the job queue 58 information about job assignment, for example, the created cluster 39 and the nodes 22 in the cluster 39 which are assigned the processing job. In some example embodiments in which the processing job comprises AI model training, the Compute Management Service 50 may transmit to the job queue 58 links to access the base model and/or intermediate model and/or training data, such as signed uniform resource locators (URLs), for use by the assigned nodes 22 to read/write the model. The Compute Management Service 50 may additionally transmit to the job queue 58 additional information pertaining to the nodes 22 and/or the clusters 39 which may be needed or useful for the job processing. Such information may for example be transmitted from a data store, such as a database 48. The Compute Management Service 50 may assemble a payload comprising the information necessary and/or useful for executing the incoming processing job.

In some embodiments, the Compute Management Service 50 is configured and programmed to reconfigure one or more clusters 39 in the middle of a processing job. Such reconfiguration may include creating one or more new clusters and/or redistributing available computing node(s) 22 by adding and/or removing nodes 22 to the initially created cluster 39. Such reconfiguration may occur dynamically during which the processing job(s) is in progress. For example, an assigned node 22 may indicate a change in status in the middle of a processing job, for example, such assigned node 22 may no longer demand heat and thus wish to stop the job processing. Such an assigned node 22 may transmit to the Compute Management Service 50 an indication of the status change. In response, the processing job may be suspended. The initially created cluster may in some embodiments be freed up. The Compute Management Service 50 may be configured and programmed to configure a new job, which may for example be an unfinished processing job. The new job (e.g., an unfinished processing job), along with any newly created cluster information, and/or partially trained model and/or training data may be transmitted to the job queue 58.

In some example embodiments, the central processing platform 12 comprises a second API component that is programmed and configured to orchestrate the processing jobs between the distributed computing nodes 22. Such a second API component may be referred to as the "Distributed Training Service 52". The Distributed Training Service 52 may be programmed and configured to pick up a processing job from the job queue 58, and additionally, the information pertaining to the specific processing job (e.g., base model/intermediate model and/or data set and/or cluster information) from the job queue 58. Such information may comprise all information that is necessary to start a new processing job or restart (i.e., continue) an already-started processing job. The Distributed Training Service 52 communicates such information to the assigned nodes 22. The assigned nodes 22 is programmed and configured to execute the assigned processing job.

In some embodiments, Distributed Training Service 52 is configured and programmed to manage errors that may disrupt operations (e.g., the executing of a processing job) identified during the monitoring of the nodes 22. The Distributed Training Service 52 may be programmed and configured to handle errors by identifying and/or classifying errors (e.g., client versus server errors and temporary versus permanent errors), providing error messages on the system, error logging, and/or designing retry mechanisms, timeout configuration, and/or fallback strategies. In some embodiments, the Distributed Training Service 52 is not communicatively connected to any data stores (e.g., storage medium 46 and database 48) in the system.

In some example embodiments, the central processing platform 12 comprises a third API component that is programmed and configured to monitor the statuses of the computing nodes 22. Such a third API component may be referred to as the "Adaptive Cluster Configuration Service 54" In some embodiments, a computing node 22 becomes available when a user signals a heat demand to the respective heating system 14, for example via an input such as a physical switch or a thermostat at the premise. The input may not only comprise a manual input from a user. In some embodiments, one or more sensors are communicatively connected to the heating system 14. For example, the one or more sensors may be configured to detect a temperature change in a surrounding, and in response to a detected temperature that deviates from a pre-set temperature range or value, transmit a signal to the respective computing node or value, transmit a signal to the respective computing node 22 to signal an available status. The status of such computing nodes 22 may be indicated as being an available computing node 22 on the central processing platform 12. In some embodiments, the Adaptive Cluster Configuration Service 54 is programmed and configured to monitor the dynamically changing statuses of the computing nodes 22 including for example any computing nodes 22 that became available and/or any computing nodes 22 that became unavailable before or during a processing job, or between processing jobs. Such node status monitoring may be performed continuously or at set timed intervals. The Adaptive Cluster Configuration Service 54 may be programmed and configured to provide clustering options (e.g., the available nodes 22 to create a new cluster 39 and/or the available nodes 22 to add to an initially created cluster 39 and/or to remove from an initially created cluster 39, etc.) to the Compute Management Service 50. The Compute Management Service 50 may be programmed and configured to create and/or reconfigure the clusters 39 and/or redistribute nodes/processing jobs according to the information provided by the Adaptive Cluster Configuration Service 54. Such information may be transmitted before and/or in the middle of a processing job. In some embodiments, the reconfiguration of clusters 39 and/or redistribution of nodes/processing jobs results in the creation of a new cluster 39 and/or reconfiguration of the initially created cluster 39 containing a different set and/or number of nodes 22 compared to the initially created cluster of computing nodes 22, i.e., the cluster of nodes 22 which was previously assigned the processing job.

In some embodiments, a storage medium 46 is communicatively connected to the Compute Management Service 50. In some embodiments, the storage medium 46 is connected to one or more of the computing nodes 22. In some example embodiments, the storage medium 46 is a model storage component 46 configured to store one or more intermediate models. Intermediate models may be models that have been partially trained (or processed) by one or more nodes 22 on the platform 12. In some embodiments, the assigned nodes 22 are programmed and configured to upload the model which it had processed/trained on. Such a model may be a partially trained model (i.e., an intermediate model). In some embodiments, the assigned nodes 22 are programmed and configured to transmit to the model storage component 46 an intermediate model at the end of each training epoch. In the event that the Compute Management Service 50 considers it necessary or preferable to reconfigure the created clusters, intermediate models may be transmitted from the model storage component 46 to the Compute Management Service 50. The Compute Management Service 50 may transmit (or provide a link to access thereto) the intermediate model to the job queue 58 for transmitting to the subsequently assigned nodes 22 in the new cluster 39 to continue job processing on such intermediate model. One or more intermediate models may be stored for use as a starting point in subsequent training epochs that may occur on newly created or reconfigured clusters 39 and/or redistributed computing nodes 22. In some example embodiments, the Compute Management Service 50 may be programmed and configured to communicate to the model storage component 46 to generate one or more signed uniform resource locators (URLs), which may be temporary, comprising information about a specific intermediate model. The Compute Management Service 50 may be programmed and configured to transmit the generated signed URLs to the job queue 58, which may be transmitted to the Distributed Training Service 52 for transmittal to the respective nodes 22 (e.g., the nodes in the newly created or reconfigured clusters 39) when the respective new processing job (which may include incomplete processing jobs) is being picked up by the Distributed Training Service 52. The nodes 22 may then use such signed URLs to read and/or write models from/to the model storage component 46. Using the signed URLs, the subsequently assigned node 22 may download the intermediate model to continue the processing job (e.g., AI model training), or upload the intermediate model after the training epoch is complete.

In some embodiments, a database 48 is communicatively connected to the Compute Management Service 50 and/or the Adaptive Cluster Configuration Service 54. In some embodiments, the database 48 is configured to store configuration and/or status information about the nodes 22 and clusters 39. Examples of configuration information include for example the node's device ID, affinity, host name, externally and internally accessible IP addresses, MAC address and/or software processes, etc. The database 48 may be configured to store any information about the nodes 22 and/or clusters 39 which are useful in determining the assignment of nodes 22 in the creation of new clusters 39 and/or reconfiguration of initially created clusters 39, to the new processing jobs (which may include incomplete processing jobs). In some embodiments, the Compute Management Service 50 is programmed and configured to receive node/cluster information from the database 48, and to transmit at least certain of such node/cluster information to the job queue 58.

Some aspects of the invention pertain to methods of capturing heat energy. In some embodiments, the method of capturing heat energy comprises receiving, at a central processing platform (such as at a first API component, the Compute Management Service 50 in an example embodiment) a job processing request such as an AI model training job or an AI inference job, etc. The job processing request may be transmitted from a client 40 through a dashboard interface 42. In response to the job processing request, the central processing platform (such as the first API component, the Compute Management Service 50 in an example embodiment) may create a cluster 39 comprising one or more computing nodes 22 that are indicated as being available on the platform. In some example embodiments, a second API component (e.g., an Adaptive Cluster Configuration Service 54) monitors the status of the nodes 22 on the platform. The second API component (e.g., an Adaptive Cluster Configuration Service 54) may transmit to the first API component (e.g., the Compute Management Service 50) clustering options. In some embodiments, the central processing platform (such as the Compute Management Service 50 in an example embodiment) transmit to a job queue 58 information pertaining to the processing job, which may include information pertaining to the created cluster 39 and nodes 22 that are assigned to execute the processing job. In some embodiments, the central processing platform (such as the Compute Management Service 50 in an example embodiment) transmits to the job queue 58 a signed URL comprising information and/or access to the assigned processing job, for example, to read and/or write models of the requested model training job. The Compute Management Service 50 may assemble the whole payload which contains all of the information needed for the assigned cluster 39 and nodes 22 to process the assigned job. Such information may for example, include the base model or intermediate model, and/or training data. Such models may be transmitted from the model storage 46 to the Compute Management Service 50. Such information may additionally include information (e.g., identification information) about the assigned clusters 39 and/or nodes 22. Such information may be transmitted from the database 48 to the Compute Management Service 50.

In some embodiments, a third API component (e.g., a Distributed Training Service in an example embodiment) selects a processing job from the job queue 58. The payload comprising information about the selected processing job may be transmitted to the Distributed Training Service. The Distributed Training Service transmits to the assigned cluster 39 and nodes 22 any of the received information necessary for the assigned nodes 22 to start the processing job, for example, a signed URL comprising information and/or access to the assigned processing job. The assigned node(s) 22 in the created cluster 39 execute the requested processing job.

Each of the computing nodes 22 are connected to a heating system 14 which may be installed in a premise. In some embodiments, the availability of a computing node 22 is in response to a demand for heat at the premise. The execution of a processing job thus generates the heat that is demanded at the premise. In some embodiments, an assigned computing node 22 changes its availability status in the middle of a processing job, for example because the respective heating system 14 which the node 22 is connected to no longer have a need to output heat at the premise 18. The node 22 communicates its change in availability status to the central processing platform (such as at the first API component, the Compute Management Service 50 in an example embodiment). In response to a change in availability of the assigned computing node 22, the ongoing processing job may be suspended. The central processing platform (such as at the first API component, the Compute Management Service 50 in an example embodiment) may reconfigure the cluster 39 such as by creating a new cluster 39 containing one or more available nodes 22. The second API component (e.g., an Adaptive Cluster Configuration Service 54) may transmit to the first API component (e.g., the Compute Management Service 50) clustering options as described elsewhere herein. The number of nodes 22 in the new cluster 39 may be different from the number of nodes 22 in the initial cluster 39. The reconfigured cluster 39 and the information required to continue to process the processing job (such as an intermediate model from the model storage 46) may be transmitted to the job queue 58 from the Compute Management Service 50. Such a processing job may be referred to as a new processing job, but such a new processing job may be a processing job that is partially fulfilled (e.g., a partially trained model that requires further training to complete). The new processing job may be picked up by the third API component (e.g., a Distributed Training Service in an example embodiment) from the job queue 58. The payload comprising information about the selected new processing job may be transmitted to the Distributed Training Service. The Distributed Training Service transmits to the assigned new cluster 39 and nodes 22 any of the received information necessary for the assigned nodes 22 to continue the processing job. The assigned node(s) 22 in the new cluster 39 execute the requested processing job.

In some embodiments, the assigned nodes 22 upload to the model storage 46 a model that may be in a partially trained state (e.g., an intermediate model) at the end of each training epoch. The intermediate model may be transmitted to the central processing platform (such as the first API component, the Compute Management Service 50) in the event of an availability status change at the assigned nodes 22 which requires reconfiguration of the cluster 39. The central processing platform (such as the first API component, the Compute Management Service 50) may transmit a link to access and read/write (e.g., a URL) the intermediate model to the job queue 58. The Distribute Training Service 52 may pick up such URLs for transmitting to the new cluster 39 of assigned nodes 22. The assigned node(s) 22 in the new cluster 39 continue to execute the processing job, using the intermediate model as the starting point.

The reconfiguration of clusters if needed are repeated until the requested processing job is complete.

Where a component (e.g. a software module, processor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, code for configuring a configurable logic circuit, applications, apps, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Software and other modules may reside on servers, workstations, personal computers, tablet computers, and other devices suitable for the purposes described herein.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms. These terms ("a", "an", and "the") mean one or more unless stated otherwise;
- "and/or" is used to indicate one or both stated cases may occur, for example A and/or B includes both (A and B) and (A or B);
- "approximately" when applied to a numerical value means the numerical value ±10%;
- where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and

"first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A system for capturing heat energy comprising:

a central processing platform;

at least one heating system comprising at least one computing unit, the at least one computing unit having one or more computing nodes communicatively connected over a wired and/or wireless network and to the central processing platform, wherein the at least one heating system is installed at a premise, the at least one heating system being configured to output heat generated from the respective at least one computing unit by the one or more computing nodes executing a processing job;

one or more Application Programming Interfaces (API) components on the central processing platform, the one or more API components comprise:

a Compute Management Service programmed and configured to receive a request for a processing job, and in response, create a cluster comprising the one or more computing nodes that are indicated as having an available status, wherein the available status of the one or more computing nodes correlates with a demand for heat at the respective at least one heating system, and wherein the one or more computing nodes in the created cluster is programmed and configured to execute the processing job assigned by the Compute Management Service; and a Distributed Training Service communicatively connected to the one or more computing nodes, wherein the Distributed Training Service is programmed and configured to orchestrate the incoming processing jobs among the one or more computing nodes in the created cluster that are assigned the processing job by the Compute Management Service;

a job queue communicatively connected to the Compute Management Service and the Distributed Training Service, wherein the job queue is configured to receive from the Compute Management Service information about the processing job and to transmit to the Distributed Training Service said information about the processing job.

2. The system as defined in claim 1, wherein the orchestrating at the Distributed Training Service comprises receiving the processing job from the job queue, and communicating the processing job to the assigned computing nodes in the created cluster.

3. The system as defined in claim 1, wherein the orchestrating at the Distributed Training Service comprises transmitting the information about the processing job to the assigned computing nodes in the created cluster.

4. The system as defined in claim 3, wherein the information about the processing job comprises access to a base model, an intermediate model, and/or training data that are necessary for the assigned computing nodes to start the processing job.

5. The system as defined in claim 1, wherein the information about the processing job comprises information about assignment of computing nodes in the created cluster.

6. The system as defined in claim 1, the one or more Application Programming Interfaces (API) components additionally comprise an Adaptive Cluster Configuration Service communicatively connected to the Compute Management Service, the Adaptive Cluster Configuration Service being programmed and configured to transmit to the Compute Management Service clustering options for creating the cluster.

7. The system as defined in claim 1, wherein the one or more computing nodes are communicatively connected to the Compute Management Service, the one or more computing nodes are programmed and configured to communicate to the Compute Management Service, in the middle of the processing job, a change of status availability from the available status to an unavailable status.

8. The system as defined in claim 7, wherein the Compute Management Service is programmed and configured to reconfigure the created cluster to generate a new cluster comprising one or more computing nodes, the new cluster of one or more computing nodes are configured and programmed to continue executing the processing job.

9. The system as defined in claim 1, further comprising a model storage component communicatively connected to the Compute Management Service and the one or more computing nodes, wherein the model storage component is configured to store intermediate models, wherein the intermediate models are uploaded to the model storage component by the one or more computing nodes in the created cluster at the end of each training epoch.

10. The system as defined in claim 9, wherein the model storage component is configured to transmit to the Compute Management Service one or more intermediate models, the Compute Management Service is programmed and configured to generate one or more signed uniform resource locators (URLs) comprising access to the intermediate model for providing to the one or more computing nodes in the new cluster, wherein the one or more computing nodes in the new cluster is programmed and configured to continue executing the processing job using the respective intermediate model as a starting point.

11. The system as defined in claim 1, wherein the created cluster comprises computing nodes which have node affinity with one another.

12. The system as defined in claim 11, wherein node affinity identifies each of the computing nodes by one or more of hardware compatibility, firewall configuration, network configuration and/or geographical location.

13. The system as defined in claim 1, further comprises a dashboard interface communicatively connected to the Compute Management Service, the dashboard interface being configured to transmit to the Compute Management Service the request for the processing job.

* * * * *